United States Patent
Cook et al.

(10) Patent No.: US 11,895,981 B2
(45) Date of Patent: Feb. 13, 2024

(54) PET WASTE PAPER MARKINGS

(71) Applicant: Brilliant Pet 2 LLC, Chicago, IL (US)

(72) Inventors: Alan J. Cook, Chicago, IL (US); Thomas E. Devlin, Winchester, MA (US); Kris W. Grube, Bloomington, IN (US)

(73) Assignee: BRILLIANT PET 2 LLC, Chicago, IL (US)

( * ) Notice: Subject to any disclaimer, the term of this patent is extended or adjusted under 35 U.S.C. 154(b) by 783 days.

(21) Appl. No.: 16/210,938

(22) Filed: Dec. 5, 2018

(65) Prior Publication Data

US 2019/0216041 A1     Jul. 18, 2019

Related U.S. Application Data

(63) Continuation of application No. 15/449,771, filed on Mar. 3, 2017, now Pat. No. 10,959,396, and a
(Continued)

(51) Int. Cl.
     *A01K 1/01*         (2006.01)

(52) U.S. Cl.
     CPC .................................. *A01K 1/0117* (2013.01)

(58) Field of Classification Search
     CPC .......................... A01K 1/0117; A01K 1/0157
     See application file for complete search history.

(56) References Cited

U.S. PATENT DOCUMENTS

| | | |
|---|---|---|
| 344,770 A | 6/1886 | Currier |
| 715,729 A | 12/1902 | Zimmermann |

(Continued)

FOREIGN PATENT DOCUMENTS

| | | | |
|---|---|---|---|
| CN | 103502778 A | | 1/2014 |
| CN | 103502778 | * | 8/2014 |

(Continued)

OTHER PUBLICATIONS

"BrilliantPad Self-Cleaning Dog Potty." Shark Tank Products (online) 5 pgs. Available Oct. 31, 2017. [Retrieved Sep. 19, 2022] https://allsharktankproducts.com/pet-care/brilliantpad-self-cleaning-dog-potty/ (Year: 2017).

(Continued)

*Primary Examiner* — Magdalena Topolski
(74) *Attorney, Agent, or Firm* — J. Miguel Hemandez; James R. Gourley; Carstens, Allen & Gourley, LLP (57) ABSTRACT

A waste cartridge in combination with a waste machine or apparatus that maintains waste pads for a pet owner, automatically or manually by removing and sealing soiled pads and waste and then replacing the soiled pad with a clean pad on a pet bed of the machine. The apparatus senses when a pet is using a waste pad portion and when the pet is finished, the machine takes up the soiled portion of the pad and removes and seals the soiled portion of the pad roll and the waste automatically, moving the pad into a repository for later removal and disposal of the waste cartridge when the pad roll is used up and then replacing removed pad with a new waste cartridge. The waste cartridge is comprised of a pad roll and a take-up rod attached to one end of the pad by any means such as a clip, slot or adhesive on the take-up rod. A pair of end caps on opposing ends of the take-up rod that includes a gear for attachment to a removable drive module may also be included or left off if the rod or core is directly connected to the drive module.

13 Claims, 11 Drawing Sheets

Related U.S. Application Data continuation of application No. 15/344,209, filed on Nov. 4, 2016.

(56) References Cited

U.S. PATENT DOCUMENTS

| | | | |
|---|---|---|---|
| 742,964 | A | 11/1903 | Brownell |
| 1,121,905 | A | 12/1914 | Dorricott |
| 1,630,058 | A | 5/1927 | Cundey |
| 2,099,976 | A | 11/1937 | Hagendorn |
| 2,762,580 | A | 9/1956 | Scanlon |
| 4,050,414 | A | 9/1977 | Knochel et al. |
| D621,105 | S | 8/2010 | Askinasi |
| 8,316,801 | B1 * | 11/2012 | Nottingham ......... A01K 1/0117 119/169 |
| D749,871 | S | 2/2016 | Page et al. |
| 10,531,637 | B2 | 1/2020 | Geelen |
| 11,140,864 | B2 | 10/2021 | Suchkov et al. |
| 2006/0225659 | A1 * | 10/2006 | Axelrod ................ A01K 1/011 119/164 |
| 2009/0241850 | A1 * | 10/2009 | Campbell ............ A01K 1/0117 119/164 |
| 2010/0175626 | A1 | 7/2010 | Askinasi |
| 2014/0311415 | A1 | 10/2014 | Tanigawa et al. |
| 2015/0027380 | A1 * | 1/2015 | Sasano ................ A01K 1/0157 119/161 |
| 2017/0013799 | A1 * | 1/2017 | Bolton ................ A01K 1/0155 |
| 2017/0347619 | A1 | 12/2017 | Cook et al. |
| 2018/0213748 | A1 | 8/2018 | Eom |
| 2018/0303065 | A1 | 10/2018 | Lee |
| 2020/0120892 | A1 | 4/2020 | Suchkov et al. |

FOREIGN PATENT DOCUMENTS

| | | | | |
|---|---|---|---|---|
| CN | 108684542 | A | 10/2018 | |
| CN | 109588339 | A | 4/2019 | |
| CN | 109729710 | A | 5/2019 | |
| DE | 4120216 | A1 * | 12/1992 | ............ B65G 43/08 |
| DE | 4120216 | A1 | 12/1992 | |
| GB | 2228241 | A * | 8/1990 | ............ B65G 35/04 |
| JP | 59133113 | A | 7/1984 | |
| JP | 2004242512 | A | 9/2004 | |
| JP | 2005040016 | A | 2/2005 | |
| JP | 2021092600 | A | 6/2021 | |
| KR | 20140074462 | A | 6/2014 | |
| KR | 20160149390 | A | 12/2016 | |
| KR | 20170102122 | A | 9/2017 | |
| WO | 2019044899 | A1 | 3/2019 | |

OTHER PUBLICATIONS

Replacement Rolls for The Self-Cleaning Dog Potty. BrilliantPad (online) 11 pgs. Available Sept 6, 2019. [Retrieved Sep. 16, 2022]; https:1/www.amazon.com/BrilliantPad-Replacement-Self-Cieaning-Improved-Absorbent/dp/B07XKDMMTKI (Year: 2019).

Self-Cleaning, Automatic Indoor Dog Potty. BrilliantPad (online) 11 pgs. Available May 29, 2019. [Retrieved Sep. 16, 2022] https://www.amazon.com/BrilliantPad-Automatic-Self-Cieaning-Puppies-Machine/dp/B07GRGBQHG (Year: 2019).

* cited by examiner

PET WASTE PAPER MARKINGS

CROSS-REFERENCE TO RELATED APPLICATIONS

The present invention is a continuation of U.S. application Ser. No. 15/449,771 filed Mar. 3, 2017, which is a continuation-in-part of U.S. application Ser. No. 15/344,209 filed Nov. 4, 2016, which claims the benefit of U.S. Application Ser. No. 62/351,792 filed Jun. 17, 2016, and U.S. Application Ser. No. 62/345,500 filed Jun. 3, 2016; and the present invention is a continuation of U.S. application Ser. No. 15/344,209 filed Nov. 4, 2016 which claims the benefit of U.S. Application Ser. No. 62/351,792 filed Jun. 17, 2016, U.S. Application Ser. No. 62/345,500 filed Jun. 3, 2016, and U.S. Application Ser. No. 62/250,615 filed Nov. 4, 2015, entitled "An Automatic Pad Roll System".

FIELD OF INVENTION

The present invention relates to a removable pet waste cartridge used in combination with a pet waste machine system and, in particular, to a generally removable and disposable pet waste cartridge that disposes of both the waste and its odor that are contained within a generally sealed waste pad when the pad is rolled up in its finished state for removal from the waste machine.

BACKGROUND OF THE INVENTION

There are millions of pet dogs in the United States and the rest of North America. Many dog owners even have more than one dog within their residence in Urban and Rural North America. This large number of dogs excretes a large amount of both liquid and solid waste each day of the year. Due to the busy commitments and work schedules of pet owners, the dogs are left in the residence unattended for hours or days at a time to accommodate work and event schedules of the pet owners. Dogs are known to urinate several times a day and excrete solid wastes at least once daily too. Dog owners want to keep their residences clean and without the attendant odor accompanying either urination or solid waste excrement. Pet owners are also known to teach their dogs or pets to eliminate their bodily wastes on paper within their residences or condition their pets to eliminate their waste outdoors when the pet owner takes the pet for a walk outdoors. Many municipalities have adopted "popper scooper" laws for sanitary reasons that means pet owners are picking up nasty solid waste on their walks with the pet outdoors.

Outdoor elimination of pet waste can become problematic due to extreme weather conditions found by pet owners in the time allotted to daily walk their pet. If the weather is nasty, the walk often gets postponed or delayed that stresses out the pet. Therefore, housebreaking pads are used by tens of thousands of home owners with their puppies and dogs around the country. Dog owners, especially in large cities where dog parks and available yards are at a minimum, generally prefer to "paper" train their pets. Because of work schedules, some owners may not get home to walk the dog on time, so they "paper" train the pet to use the pads to prevent the dog from eliminating indiscriminately in the house or apartment. Many apartment dwelling dogs, especially among the smaller, breeds, are "paper" trained exclusively. Whether they are used for housebreaking for puppies or for "paper" training indoor dogs, who will use these pads throughout their lifetime, housebreaking pads are one of the larger expenditures for dog owners.

In U.S. Pat. No. 8,464,662, describes an apparatus that maintains housebreaking pads for a pet owner, automatically removing and sealing soiled pads and waste and replacing the soiled pad with a clean pad. The apparatus senses when a pet is using a housebreaking pad, and when the pet is finished, removes and seals the pad and the waste automatically, moving the pad into a repository for later disposal and replacing the soiled pad with a clean pad. The apparatus seals the waste and pad with plastic film having low vapor permeability for disposal on a once-daily or less frequent basis. The apparatus minimizes or eliminates odors associated with canine elimination by removing the pads immediately after elimination is completed, and sealing the waste. A control unit, triggered by a sensor, has a single cycle or a multiple cycle operation, operating a motor that rolls the soiled composite pad onto an arbor in the repository.

Another, major problem that plagues pet owners is the annoyance of replacing soiled pads. Offensive odors from the soiled pads may permeate the household. Owners need to flush the feces down a toilet or place in a sealed container to decrease the odor. Dogs, especially puppies, when stressed sometimes develop the undesirable habit of eating their own feces. If the dog develops the habit, the dog owner needs to pick up fecal matter quickly to break the habit. Disposing of the fecal matter and the pads is not only a continual annoyance, but also causes dog owners to bend down multiple times a day, often bothering the lower back and stressing the knees. There is also the possibility that the pet owner will end up with urination or fecal matter on their hands, clothing or other residential items when disposing of open faced pads or paper haphazardly rolled up to contain the pet waste. This is especially burdensome to the elderly, physically handicapped, and blind who have companion, assistance, or guide dogs. The handling of pet waste may also affect the overall health of the elderly person who comes in contact with fecal or urination on their hands and clothing and due to poor eyesight or numbness in their fingers does not realize that the pet waste is still on their hands.

SUMMARY OF THE INVENTION

An object of the present invention is to provide a removable and disposable pet waste cartridge.

A further object of the present invention is providing a removable pet waste cartridge where a pet owner avoids touching the pet waste at time of disposing of a spent pet waste cartridge.

Another object of the present invention is to provide a pet waste cartridge that seals in the liquid and solid pet wastes when the waste pad is rolled up into a final state for disposal.

A removable waste cartridge in combination with a pet waste machine comprises a pad in a roll of a predetermined diameter, length and width having an absorbent front side and a back side of non-permeable material. A take-up rod passes through the axis of the pad during its take-up on the rod. A pair of end caps is mounted at opposing ends of the rod for guiding the take-up function of the soiled portion of the pad. The pad roll of the waste cartridge is placed in a supply assembly at one end of the waste machine to have one end of the roll stretched across a pet bed on the machine for a connection to a take-up rod with a pair of end caps mounted on opposing ends of the rod that is located in the take-up assembly during operation of the machine.

Further, the waste machine advances the roll of pads either manually or automatically after pet waste is deposited and then observed, or automatically detected on the pad until the entire roll of pads is wound around the take-up rod and ready for disposal with the end caps holding the pet waste and attendant odor therein.

Moreover, a pet waste removable cartridge for use with a pet waste machine comprises a take-up core of a predetermined diameter, length and width. The roll of waste pad formed by winding a flexible material around the core, said roll of waste pad having an absorbent waste surface on one side and a non-permeable surface on the other side; and a pair of generally cylindrical end caps although the end caps are capable of other shapes as a square or other shapes between a circle and a square mounted on opposing ends of the core for guiding the rolling of the pad around the core during the take up of the waste pad when winding it around the core. The core or rod passes through the axis of the rolled up waste pad in the take-up assembly.

The pet waste removable cartridge has one end of the waste pad attached to the rod by tape by holes in the pad fitting over corresponding pins mounted on the rod, by feeding the pad through a slot in the rod including a tapering of the pad to facilitate the feeding of the pad through the slot or by feeding the pad under one or more clips integrally formed on the rod or integrally formed on the end cap. The pet waste removable cartridge includes the end caps to seal or partially seal exposed ends of the rolled up waste pad to contain the odor and waste therein.

The pet waste removable cartridge with at least one end cap provides an interface with the waste machine for manual or automatic advancement of the waste pad therethrough. The waste pad is capable of manually being advanced from the supply assembly to the take-up assembly by a handle crank mechanically connected to the rod or by a foot treadle that is mechanically connected to the rod when stepped upon or a foot roller mechanically connected to the rod for its rotation. The pet waste removable cartridge requires the take-up core to interface directly to a mechanism for manual or automatic advancement by a motor of the waste pad with or without the end caps.

The pet waste removable cartridge includes a waste pad with a series of marks for detection by waste machine to determine pad status in the machine. For example, the end user requires information about how much waste paper or pad is left in the supply assembly. Also, when a new roll is installed to replace a spent one, the machine needs to know that a new roll of waste paper is installed. And there are many more signals to the machine by how the series of mark or holes or notches on the paper are capable of indicating or configuring the machine with its electronic control components and drive motor within the control module.

A roll of pet waste paper for use with a waste machine comprises a waste pad or paper with an absorbent front side material and a non-absorbent back side. This configuration of the roll of waste paper prevents leakage of urine and feces from the pet through the waste paper. The marks on the roll of waste paper further alerts the end user of various states of the roll of waste paper as it is consumed by manual and automatic advancement through the machine per a designed program entered into the control module by the end user. The mark on the waste paper provides information for determining future use or information on how to set up the machine for future use by the end user. The marks on the pet waste paper are printed on either the front or back sides of the waste paper. In addition, the marks on the pet waste paper are either visible or invisible on the front or back sides of the waste paper. The marks on the pet waste paper are absorptive or reflective to infrared light, I_TV light or other light spectrums. The marks on the pet waste paper are often printed at predetermined spaced intervals or at variably spaced intervals usually at one of the edges along a length of the paper. The marks on the pet waste further include holes or notches on the papa• that replace or add to the marks on the waste paper. The pet waste paper as recited in claim 15 wherein the paper includes an absorptive non-woven spun bond on a top layer for tear resistance, an absorbent polymer in a middle layer and a plastic non-absorbent bottom layer for leak protection from the liquid and solid waste.

BRIEF DESCRIPTION OF THE DRAWINGS

Embodiments of the present disclosure are described by way of following drawings pointing out the various details to the inventive automatic or manual pad roll system. The main features and advantages of the present disclosure will he better understood with the following descriptions, claims, and drawings, where:

DETAILED DESCRIPTION OF THE DRAWINGS

Figure 1:
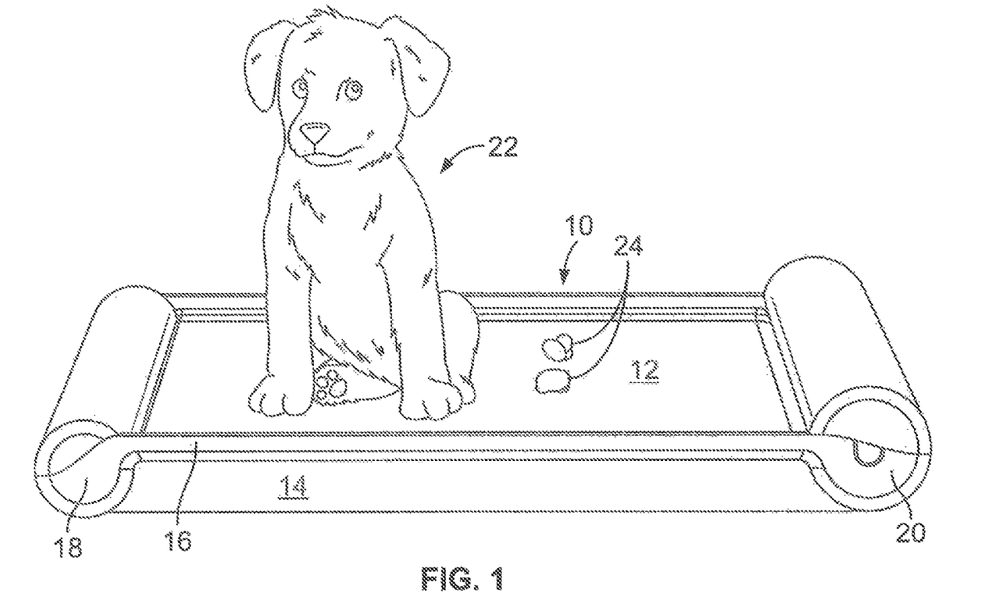
FIG. 1 is a diagrammatic perspective view of the invention demonstrating a pet eliminating on a roll of waste pads.
Figure 2:
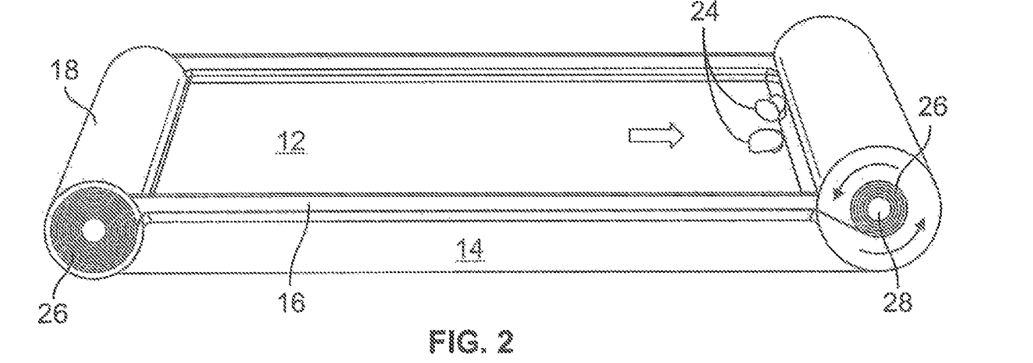
FIG. 2 is a diagrammatic perspective view of the invention with a partial elevation cut away showing the roll of waste pads in the supply assembly stretched across the pet bed to a take-up rod in the take-up assembly which shows a repository portion of the invention.
Figure 3:
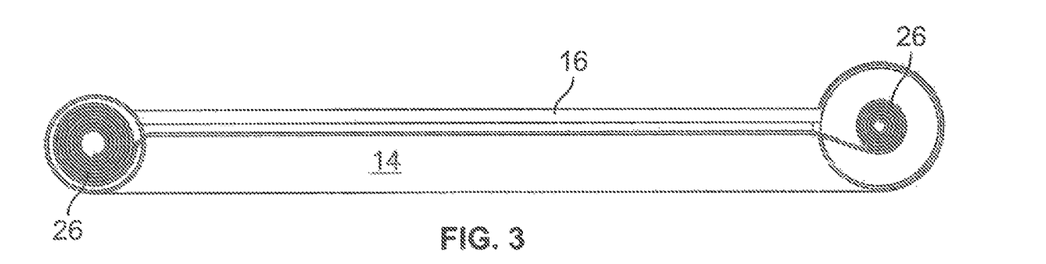
FIG. 3 is a diagrammatic side elevation view of the invention with a partial elevation cut away showing the roll of waste pads in the supply assembly stretched across the pet bed to a take-up rod in the take-up assembly which shows a repository portion of the invention.
Figure 4:
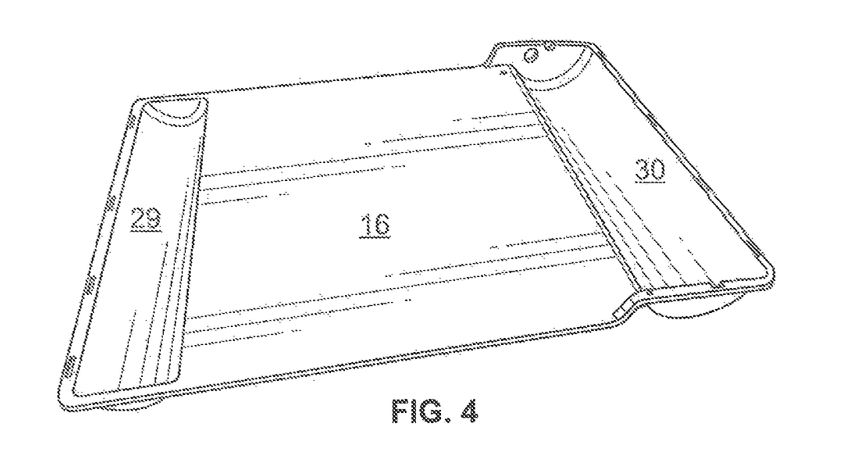
FIG. 4 is a diagrammatic perspective view of the invention showing the lower portion of the machine and the pet bed for receiving a pet roll of waste pads therein.
Figure 5:
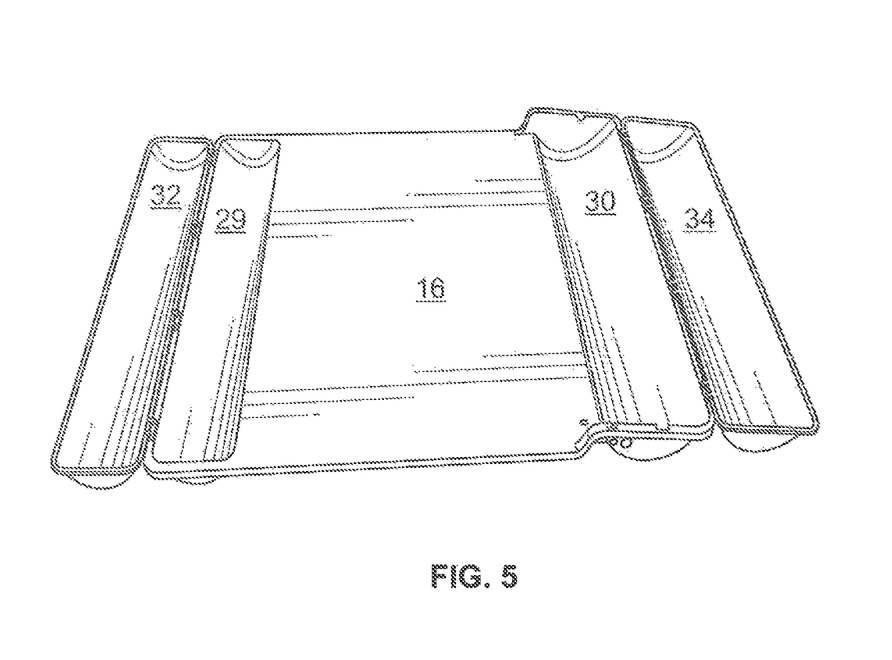
FIG. 5 is a diagrammatic perspective view of the invention showing the machine with the supply and take-up assembly covers open for receiving a pet roll of waste pads therein.

FIG. 1 illustrates an automatic or manual waste cartridge in combination with a waste machine system 10 with a waste pad 12 for later disposal with a pet 22 eliminating solid waste 24 on the pad 12. The apparatus or machine 14 detects the pet 22 eliminating solid waste 24 and when the pet 22 leaves the apparatus 14, the apparatus 14 automatically cycles the replacing of that portion of the soiled pad with a clean new portion from the pad roll 26 by removing and sealing the soiled portion of the pad 12 in a take-up assembly 20 and feeding a, clean portion of the pad roll 26 from a supply assembly 18. The apparatus is programmed to have a stage interval where the pet 22 stands on the portion of exposed pad 12 on a pet bed 16, the stage interval is followed by a repository interval as shown in FIG. 2 where the apparatus 14 removes and seals the soiled portion of the pad 12 with the solid waste 24 and any urine in the take-up assembly 20 wherein the take:-up rod or core 28 rotates in a counterclockwise direction to take up and sealed the soiled pad wound around the rod 28 within the take-up assembly 20 for later• removal and then disposal.

The repository portion is aesthetically covered by a cylindrical half portion of the machine 14 attached to the pet bed 16 with a rotatable cover 34 in the take-up assembly 20 to hide the soiled portion 12 of the pad roll 26. The elimination stage portion for the pet 22 has the machine bed 16 connected between the supply and take-up assemblies 18 and 20, respectively, where the waste pad portion 12 therebetween is set on top of the pet bed 16. The pet 22 stands on top of the pad portion 12 on the pet bed 16 and eliminate feces 24 and urine. The supply assembly also has a rotatable cover 32 with a lower cylindrical portion 29 for receiving the pad roll 26 of a predetermined length, width and diameter. The pad roll 26 when housed within the supply assembly 18 has its axis below the pet bed 16 and the waste pad portion stretched across the bed 16 to the take-up rod 28 is below the pet bed 16 to create the proper friction and tension of the pad 12 across the bed without jamming or hampering the take-up of the soiled portions of the pad roll 28 within the take-up assembly 20 and to provide taking up the soiled pad without any part of the machine contacting the top, soiled surface of the pad. The covers 32 on the supply assembly, when closed furthers the proper tension of the waste paper or pad portion 12 moving across the bed 1.6 from the supply to the take-up assemblies, respectively, as shown in FIGS. 1, 2, 3, and 26.

Figures 8, 9:
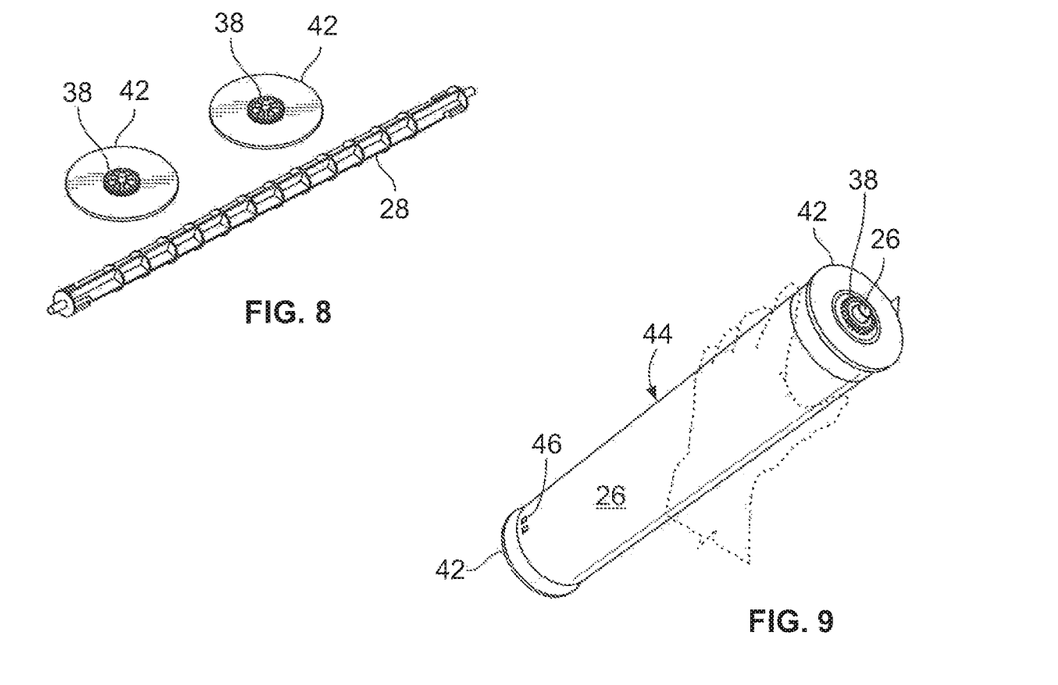
FIG. 8 is a diagrammatic perspective view of the components in the waste cartridge of the invention.
FIG. 9 is a waste cartridge ready for disposal of the invention.
Figure 10:
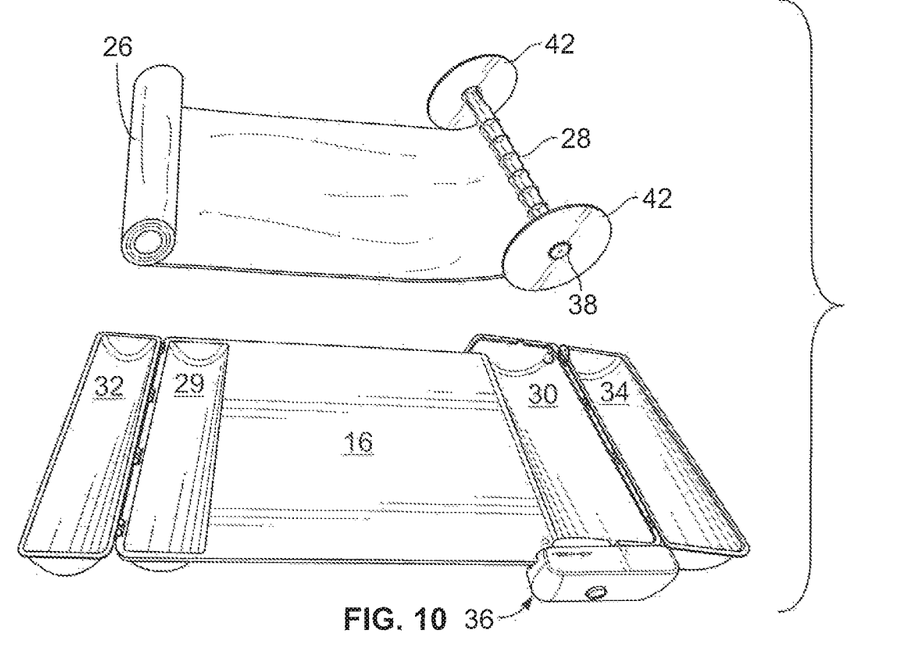
FIG. 10 is a diagrammatic perspective view of the waste cartridge components ready for installation into the waste machine.
Figure 11:
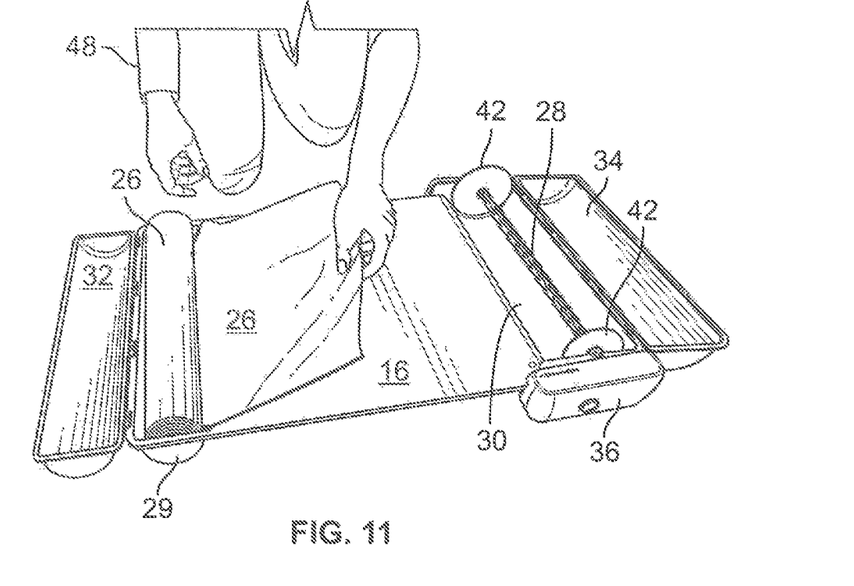
FIG. 11 is a diagrammatic perspective view of the invention with a roll of waste pad being installed on a waste machine.
Figure 12:
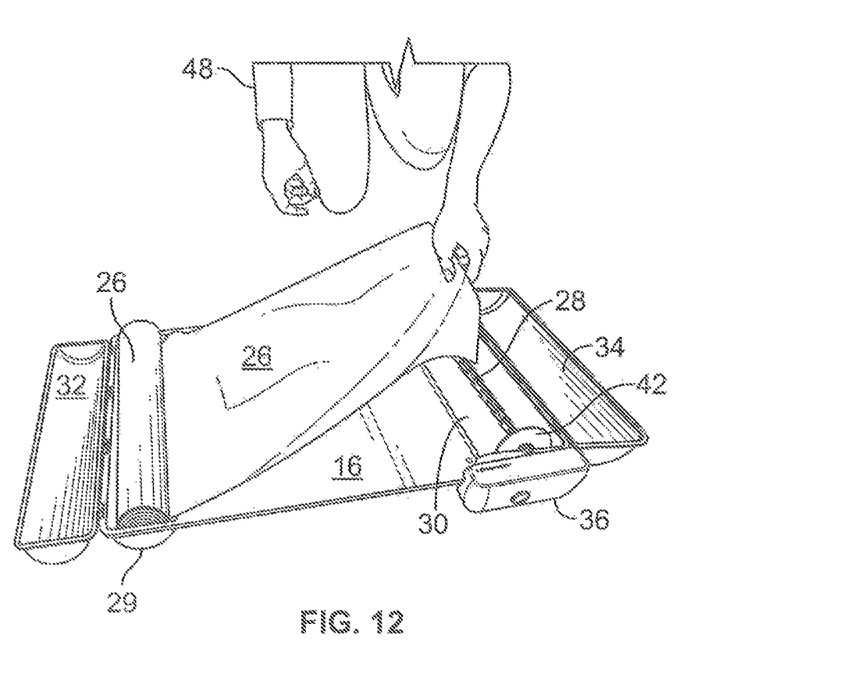
FIG. 12 is a diagrammatic perspective view continuation of the invention with a roil of waste pad being installed on a waste machine.
Figure 13:
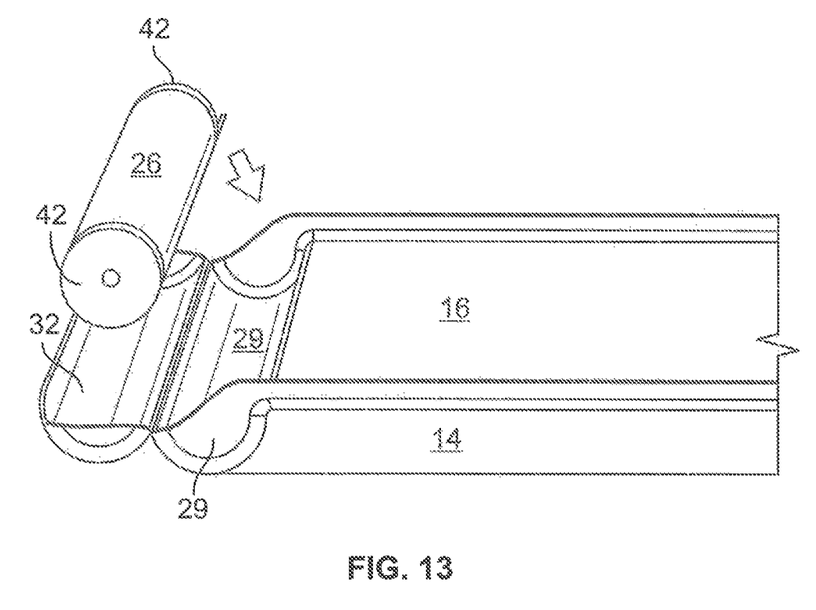
FIG. 13 is a diagrammatic perspective view of the invention showing the machine with the supply assembly receiving a pet roll of waste pads therein.
Figure 14:
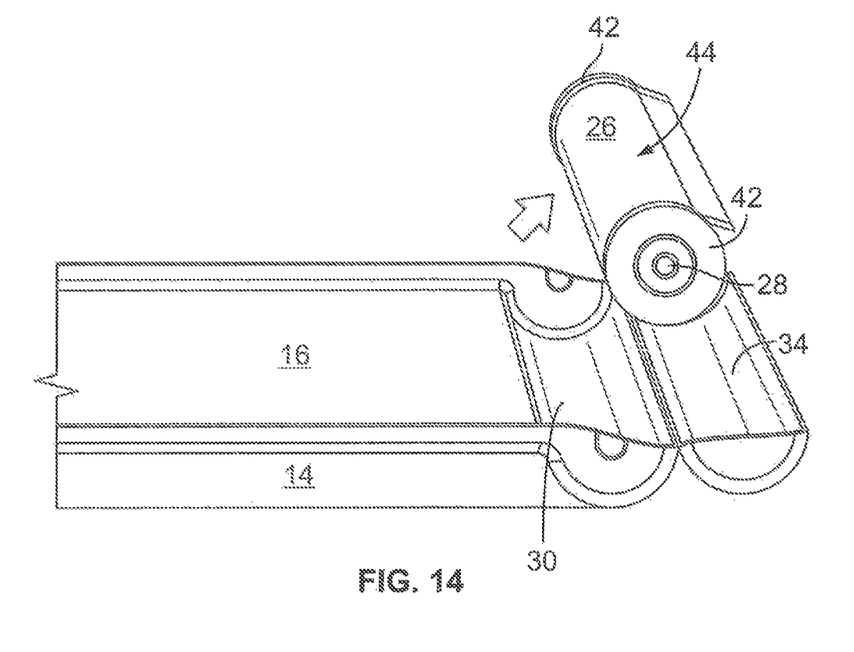
FIG. 14 is a diagrammatic perspective view of the invention showing the machine with the take-up assembly with the removal of the waste cartridge for disposal with the pet waste therein.
Figure 15:
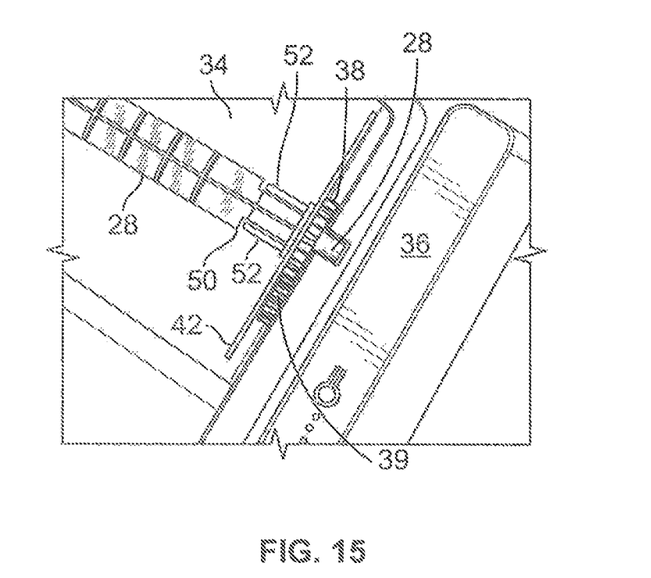
FIG. 15 is a diagrammatic perspective view of the invention showing the gearing and drive attachment of machine to the take-up assembly for receiving an end of pet roll of waste pads under a pair of clips at one end of the take-up rod.
Figure 16:
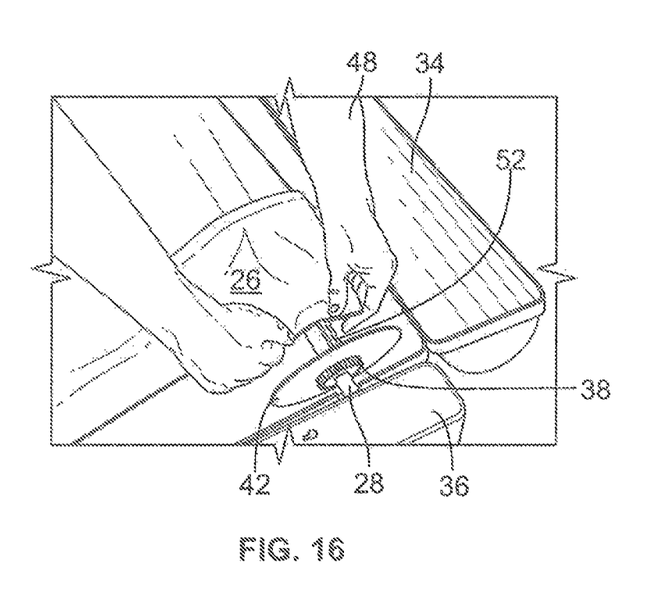
FIG. 16 is a diagrammatic perspective view of the invention showing the gearing and drive attachment of machine to the take-up assembly for receiving an end of pet roll of waste pads under a pair of clips at one end of the take-up rod and showing attachment of the one end of the pad to the clip.
Figure 17:
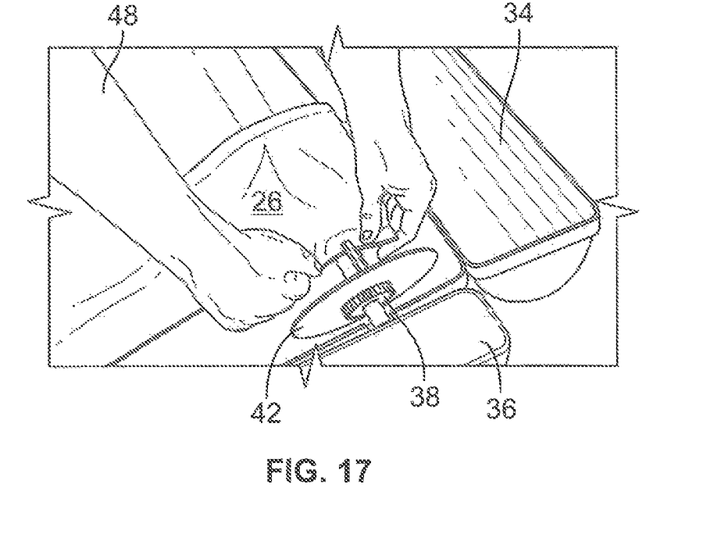
FIG. 17 is a diagrammatic perspective view of the invention showing the attachment of the one end of the pad to the clip.
Figure 19:
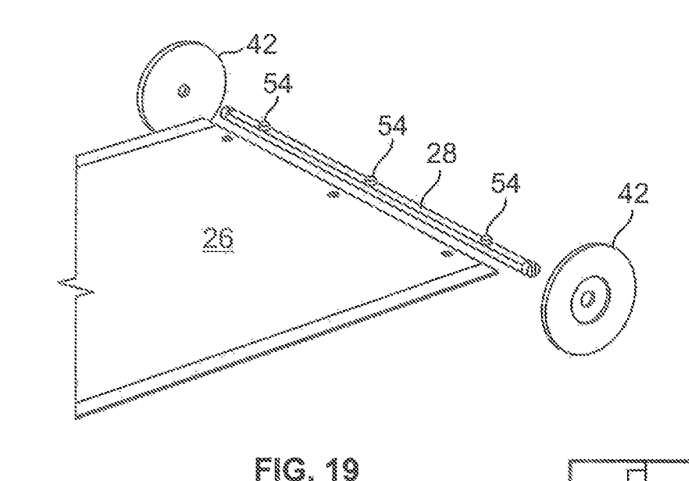
FIG. 19 is a diagrammatic perspective view of the invention showing the attachment of the one end of the pad with holes to pins on the take-up rod.
Figure 24:
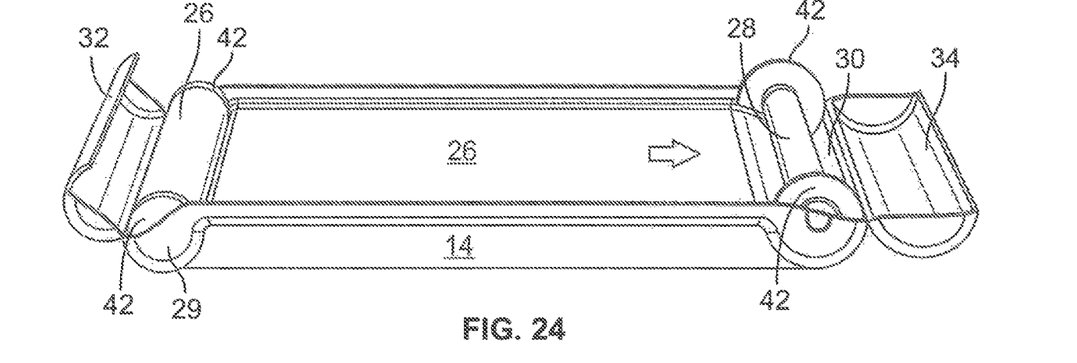
FIG. 24 is a further diagrammatic perspective view of the invention with the covers on the supply and take-up assembly opened showing the installed waste cartridge therein.
Figure 25:
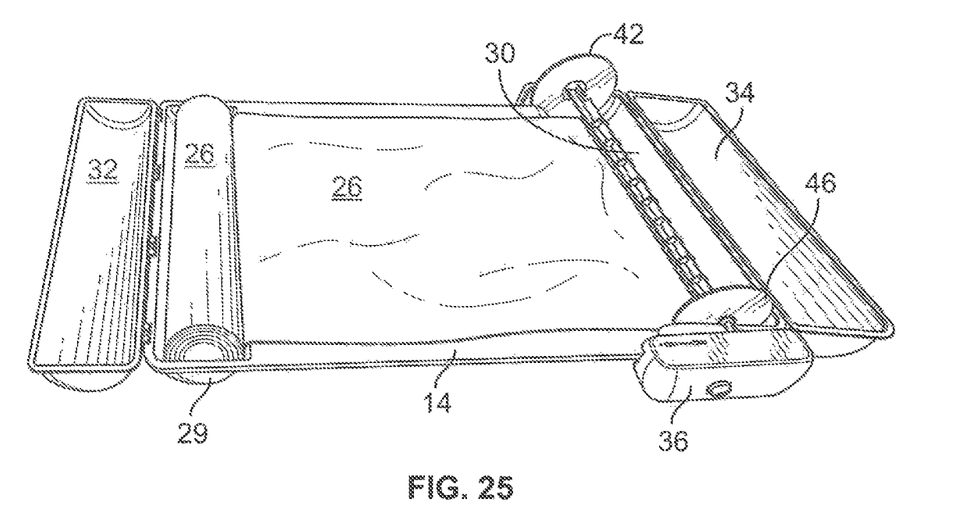
FIG. 25 is another diagrammatic perspective view of the invention with the covers on the supply and take-up assembly opened showing the installed waste cartridge therein.
Figure 26:
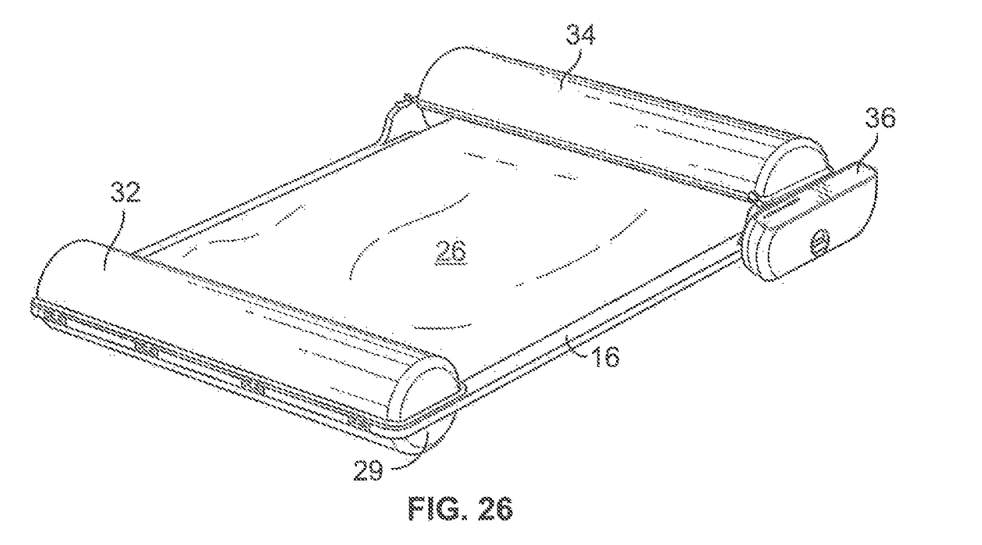
FIG. 26 is a diagrammatic perspective view of the invention with the covers on the supply and take-up assembly closed showing the installed waste cartridge and machine ready for a pet elimination.

FIGS. 8-10 illustrate a waste cartridge 44 and its components as follows: a core or rod 28, a pair of end caps 42 connected by a press fit the opposing ends of the rod 28. The end cap often includes a gear 38 to mesh with a corresponding gear 39 on the drive shaft connected to the drive with a removable control and drive module 36 that is keyed fitted with a pair of guide pins 40 to the side of the take-up assembly where the gear 39 extends through one side of the take-up assembly to engage the identical tooth meshed gear 38 on the end cap to rotate the take-up rod or core 28 in a counterclockwise rotation as shown in FIG. 2. The pad roll 28 is connected by holes at one end of the pad roll as shown in FIG. 19 press fitted over pins 54 on the rod 28. The one end of the pad roll 26 is capable of being fed through a slot in the rod 28 as shown in FIGS. 9 and 24 wherein the pad roll 26 is installed in the cylindrical half 29 of the supply assembly. The take-up rod 28 has one end of the pad roll 26 inserted through a slot on the rod 28 and attendant end caps 42 are inserted on the opposing ends of the rod 28 and placed into the cylindrical half base 30 whereupon the covers 32 and 34 are closed and the first portion of the fresh waste pad 12 is stretched across the bed 16 as shown in FIGS. 1, 2, 3, 25 and 26.

As further shown in FIG. 9, marks 46 are on the pad border for the machine to read and provide information depending on the spacing and interval of the marks 46 thereon information such as the amount of the roll left for use or a fresh roll was just installed is the type of information available from these marks or the waste paper and pad roll.

FIGS. 11-18 show the installation of the waste paper on the take-up rod 28 from stretching the waste paper 12 from the pad roll 26 across the bed 16 to the take-up rod 28 and the use of clips at one end of the take-up rod 28 wherein a right angle nib 50 provides friction against the paper when inserted underneath a pair of clips on one end of the rod 28 or under a pair of clips on opposing ends of the rod. The nib 50 with the friction engagement makes sure that the waste paper 12 does not slip off the clips on the first several counter clockwise turns of the rod within the housing of take-up assembly 20.

Figure 20:
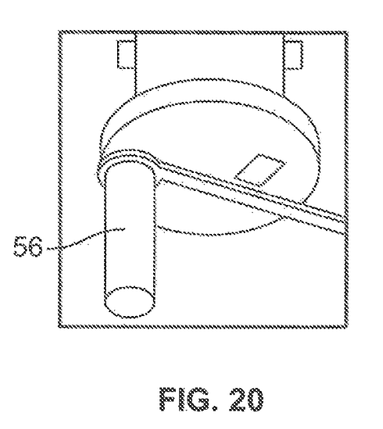
FIG. 20 is a diagrammatic perspective view of the invention showing a hand crank mechanically connected to the take-up rod in the take-up assembly.
Figure 21:
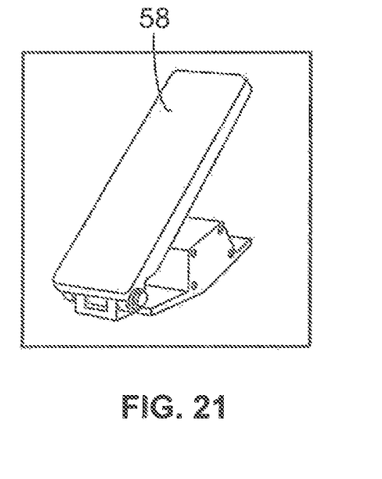
FIG. 21 is a diagrammatic perspective view of the invention showing a foot treadle mechanically connected to the take-up rod in the take-up assembly.
Figure 22:
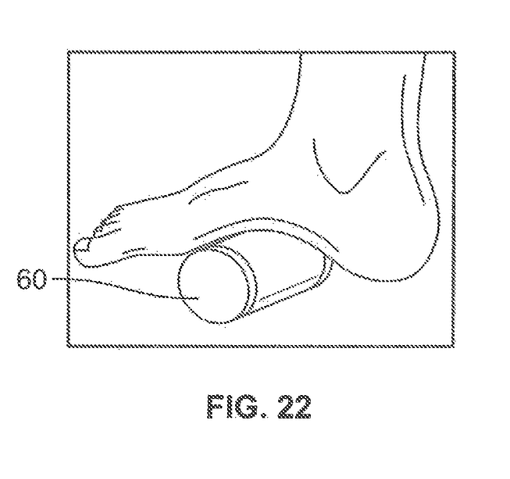
FIG. 22 is a diagrammatic perspective view of the invention showing a foot roll mechanically connected to the take-up rod in the take-up assembly.
Figure 23:
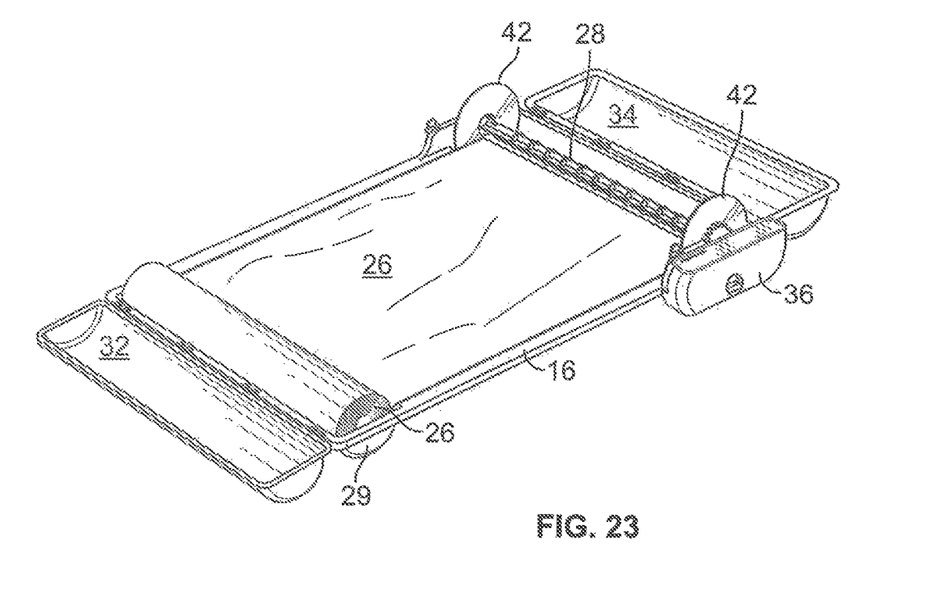
FIG. 23 is a diagrammatic perspective view of the invention with the covers on the supply and take-Up assembly opened showing the installation of a waste cartridge therein.

In FIGS. 20-22 illustrate manual advancement of the waste paper across the bed 16. A handle crank that is mechanically connected to the rod 28 to advance the soiled pad 12. A treadle 58 is shown in FIG. 21 which is stepped on to advance the pad, and FIG. 22 shows a foot roll mechanically connected to the rod 28 to advance the pad and take-up the soiled portion of the pad on the pet bed 16 after pet 22 eliminate its waste.

Figure 6:
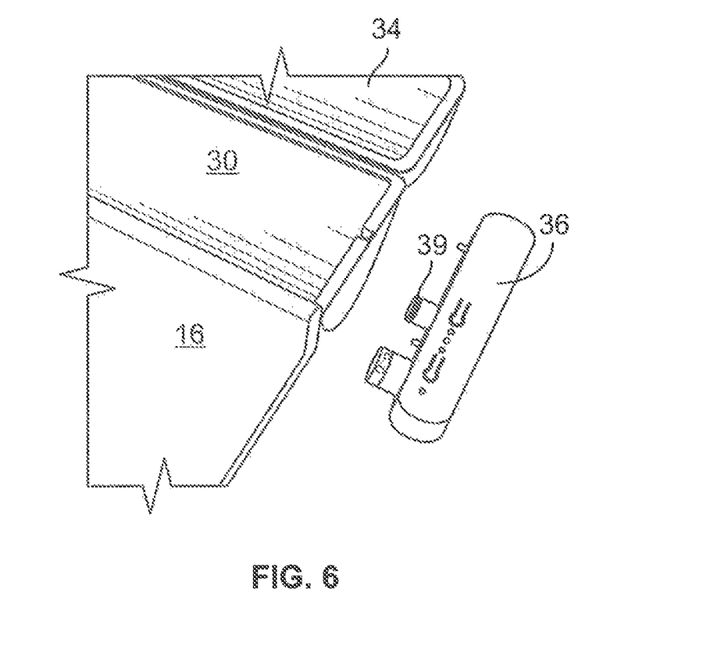
FIG. 6 is a diagrammatic perspective view of the invention demonstrating the attachment of a removable control and drive module connection to the take-up assembly.
Figure 7:
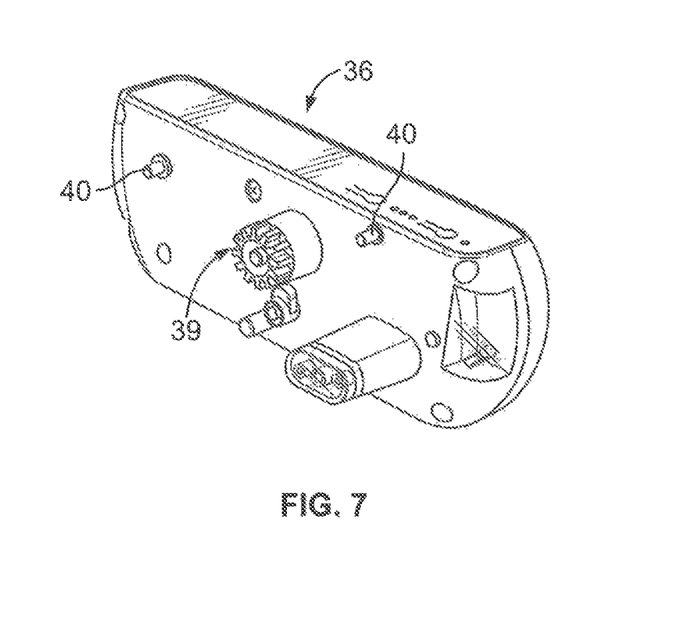
FIG. 7 is a diagrammatic perspective view of the invention demonstrating a removable control and drive module of the invention.
Figure 18:
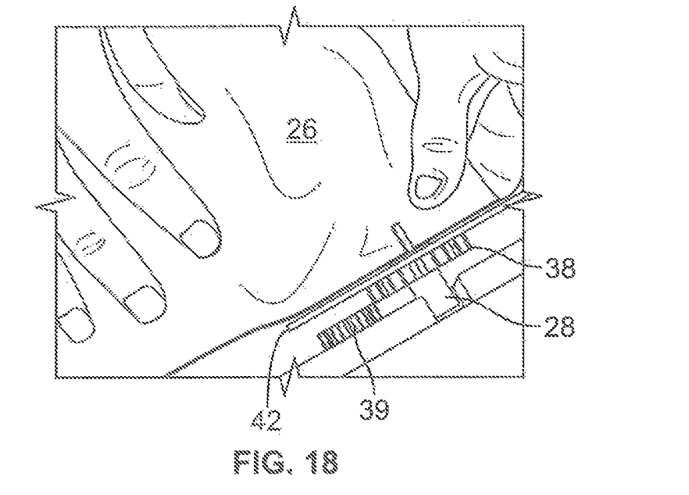
FIG. 18 is a diagrammatic perspective view of the invention showing the meshing of the gear on the end cap to the drive gear on the control and drive module.

FIG. 18 shows the meshing of identical tooth gears 38 on the end cap and gear drive on the removable control and drive module 36 during installation of the take-up rod 28 in the take-up assembly 20. FIGS. 6 and 7 show the removable control and drive module 36 that is used to program the movement of the pad across the bed 16 of the machine 14. In operation, the waste cartridge with its pad roll 26 is inserted into the supply assembly 18 while its take-up rod 2.8 attached to one end of pad is inserted into the lake-up assembly 20 with a portion of the pad 12 stretched across the pet bed 16. Then the covers of the supply and take-up 32 and 34, respectively, are closed and the waste machine is ready to accept its first dog or other pet for the elimination of its waste.

A roll of pet waste paper 26 for use with a pet waste machine 14 comprises an absorbent front side material on a roll of pet waste paper and a nonabsorbent back side material on the roll of waste paper or waste pad. Further•, the waste paper or• pad includes an absorptive non-woven spun bond on a top layer for tear resistance, an absorbent polymer in a middle layer and a plastic non-absorbent bottom layer for leak protection from the liquid and solid waste. The pet waste paper may also include an air laid paper top layer allowing the removal of other layers. The pet waste paper is capable of being configure to include either a four or five layer construction with the mixing of absorbent and non-absorbent or non-permeable layers. The pet waste paper construction could be made out of a single layer with absorbent front side and a plastic non-absorbent backside.

Having thus described the invention, we claim:

1. A kit comprising separate components for a user-assembled, disposable pet waste cartridge, the separate components comprising:
    a roll of pads for use with a pet waste machine, comprising:
        a permeable top layer configured to receive a liquid waste;
        a non-permeable bottom layer configured to retain the liquid waste within the roll of pads; and
        a series of sensor-readable mark printed on a marked portion of the non-permeable bottom layer, wherein the mark is configured to indicate a position of the marked portion of the non-permeable bottom layer along the pet waste machine;
    a single-use disposable take-up rod, wherein the take-up rod is configured to connect to a first end of the waste pad roll;
    a single-use disposable first end cap and a single-use disposable second end cap, wherein the first end cap and second end cap are configured for mounting on opposing ends of the take-up rod, wherein the first end cap and second end cap are configured when mounted on opposing ends of the take-up rod to seal a soiled portion of the waste pad roll wound around the take-up rod wherein at least one of the first end cap and the second end cap includes a gear on the first end cap or the second end cap.

2. The kit of claim 1, wherein the roll of pads further comprises a first absorbent middle layer disposed between the permeable top layer and the non-permeable bottom layer, wherein the first absorbent middle layer is configured to absorb the liquid waste.

3. The kit of claim 2, wherein the first absorbent middle layer comprises an absorbent polymer.

4. The roll of pads of claim 3, further comprising a second absorbent middle layer and a third absorbent middle layer, wherein:
    the second absorbent middle layer is disposed between the permeable top layer and the first absorbent middle layer;
    the third absorbent middle layer is disposed between the first absorbent middle layer and the non-permeable bottom layer.

5. The kit of claim 1, wherein the sensor-readable mark is invisible.

6. The kit of claim 1, wherein the sensor-readable mark is configured to be read by a light sensor.

7. The kit of claim 6, wherein the sensor-readable mark is configured to be read by an infrared sensor.

8. The kit of claim 1, wherein a plurality of sensor-readable marks are disposed at predetermined spaced intervals along a length of the roll of pads.

9. The kit of claim 1, comprising a plurality of sensor-readable marks, wherein the plurality of sensor-readable marks are printed along a single longitudinal edge of the roll of pads.

10. The kit of claim 1, wherein the sensor-readable mark is configured to indicate a distance of the roll of pads to advance.

11. The kit of claim 1, wherein the sensor-readable mark is configured to indicate an amount of the roll of pads left in the pet waste machine.

12. The kit of claim 1, wherein the sensor-readable mark is configured to indicate whether the roll of pads is tracking correctly through the pet waste machine.

13. The kit of claim 1 wherein both the first end cap and the second end cap include a gear.

* * * * *